United States Patent [19]

Biemiller

[11] 4,273,838
[45] Jun. 16, 1981

[54] WELD METAL RESISTANT TO NEUTRON-BOMBARDMENT EMBRITTLEMENT

[75] Inventor: Eric C. Biemiller, Warehouse Point, Conn.

[73] Assignee: Combustion Engineering, Inc., Windsor, Conn.

[21] Appl. No.: 763,475

[22] Filed: Jan. 28, 1977

Related U.S. Application Data

[63] Continuation-in-part of Ser. No. 664,609, Mar. 8, 1976, abandoned.

[51] Int. Cl.$^2$ .............................................. B23K 9/00
[52] U.S. Cl. ..................................... 428/683; 75/125; 75/128 W; 176/88; 219/137 WM
[58] Field of Search ................ 219/137 WM, 145, 146; 428/558, 682, 683; 176/88; 75/125, 128W

[56] References Cited

U.S. PATENT DOCUMENTS

| | | | |
|---|---|---|---|
| 2,913,814 | 11/1959 | Muller et al. | 428/683 |
| 2,913,815 | 11/1959 | Muller | 428/683 |
| 3,079,677 | 3/1963 | Flemley | 428/683 |
| 3,496,034 | 2/1970 | Alger et al. | 176/88 X |
| 4,049,431 | 9/1977 | Hagel et al. | 176/88 X |

FOREIGN PATENT DOCUMENTS

1161056  8/1969  United Kingdom .

OTHER PUBLICATIONS

Hawthorne, J. R. NRL Report 7573, Sep. 3, 1973.
Swift, R. A. et al., "Temper Embrittlement of Pressure Vessel Steels, " in *Welding Journal* Feb., 1973, pp. 57S–68S.
Batte, A. D. et al., "Creep-Rupture Properties of 2¼ CrMo weld Deposits," in *Welding Journal* Jun., 1973, pp. 261s–267s.
Fortner, E. et al., "Experimental Development of Radiation Resistent 85,000 psi Yield Strength Reactor Vessel Low Alloy Steel Filler Metal," ASME 70-MET-3.
Steele, L. E. et al., Irradiation Effects on Reactor Structural Materials, Quarterly Progress Report, NRL-2027, 1969.
Hawthorne, J. R., Nuclear Engineering and Design, 11:427–46, (1970).
Atomic Energy Review, vol. VII #2, p. 129, 1969.

*Primary Examiner*—Richard E. Schafer
*Attorney, Agent, or Firm*—Arthur E. Fournier, Jr.

[57] ABSTRACT

A range of weld metals is disclosed that is resistant to changes in nil-ductility transition temperatures (NDTT) caused by exposure to neutron fluences greater than $1 \times 10^{17}$ neutrons per square centimeter. Designed for use in nuclear reactor pressure vessels, the weldment that exhibits this resistance to neutron-induced ductility decreases is characterized by the condition that an index is less than 0.4. That index is the ratio of the sum of the weight percentages of nickel and silicon in the metal to the sum of the weight percentages in the metal of manganese, chromium and molybdenum. This constraint on the index, when applied to a weld metal within the composition ranges given in this specification, gives a weldment resistant to neutron-induced property changes.

16 Claims, 3 Drawing Figures

NDTT SHIFT NORMALIZED TO A FLUENCE = 3.0 x 10$^{19}$ n/cm$^2$, >1 Mev
VERSUS A/B RATIO (WEIGHT PERCENT VALUES)
TRENDS RELATIVE TO COPPER CONTENT

○ Cu >0.15
◇ .05<Cu≤0.15
△ Cu ≤.05

A/B = (Ni+Si)/(Mn+Mo+Cr)

WELD METAL RESISTANT TO NEUTRON-BOMBARDMENT EMBRITTLEMENT

BACKGROUND OF THE INVENTION

This is a continuation-in-part of application Ser. No. 664,609, filed Mar. 8, 1976, and now abandoned.

It has been observed that steels of the type currently used in the pressure vessels of nuclear reactors experience ductility changes after prolonged exposure to high-energy (>1Mev) neutrons. The result is that lower stresses can be tolerated as the pressure vessel ages, necessitating long plant startup and shutdown procedures. Lengthy procedures of this type are normally quite costly.

In some cases the weld metal, rather than the plate material, is the limiting factor that determines the amount of stress the vessel can tolerate and, consequently, how long the startup and shutdown procedures must be. It is therefore advantageous that weld metals be used that can equal or surpass the resistance of pressure-vessel plate materials to neutron-induced changes.

The change in the toughness of a metal is measured by a standard test called the Charpy V-notch impact test. A standard-sized sample of the metal to be tested is subjected to an impact from a pendulum, and the sample is thereby broken. The ductility of the specimen is determined by the amount of energy it absorbs from the pendulum, and the nil-ductility transition temperature for a given specimen is the temperature at which it absorbs a given amount of energy, typically 30 ft.-lbs., from the impacting pendulum. The change in this quantity due to irradiation-induced effects is referred to as the $\Delta$NDTT. It is desirable for a weld metal to exhibit at least as low a $\Delta$NDTT in response to irradiation as the plate metal that it joins.

Unfortunately, it is not enough, in order to watch the $\Delta$NDTT of the plate material, to provide a weldment that has the same constituent percentages as the plate material. A steel plate and a steel weld can have identical chemical compositions and yet be different materials having dissimilar mechanical properties because of metallurgical structural differences. This phenomenon is similar to the more well-known differences between snow and ice or diamond, graphite, and amorphous carbon; the substances are the same, but their structures and, therefore, their properties are different. In the current state of the art, reactor pressure vessel plate material receives a special heat treatment to ensure a bainitic metallurgical structure with specific mechanical properties. This heat treatment generally consists of raising the plate's temperature up to what is known as the austenitization range ($\sim$1600° F.) followed by water quenching. The rapid cooling during quenching causes bainite formation in the plate. The heat treatment, then, gives the desired mechanical properties. It is not feasible to heat treat a weldment in a like manner because the weldment has joined the plates into a large structure which in many cases prohibits total heat treatment. Localized or zone heat treatment of the weldment is conducted, for the most part, just to relieve internal stresses, and this heat treatment is conducted at temperatures below the austenitization range, which prohibits structural changes. To locally heat treat a weld in a manner similar to the heat treatment of plate would produce undesirable stresses in the structure. It is not an ordinary practice, then, to simply select a weld alloy based on the alloy of the plate to be joined. Generally, different chemical contents for the weld are necessary to meet strength requirements. In this respect, the welding art is different from basic steelmaking processes.

In view of the advantages of using a weldment that is at least as resistant to neutron radiation as the plate material that it joins, numerous experiments have been conducted over the past fifteen years for the purpose of characterizing the contributions of various weld-alloy constituents to the resistance of the alloy to neutron-induced changes. These studies have uncovered a number of individual alloys that exhibit the necessary characteristic of retaining toughness at least as well as the plate metal. However, while discoveries of individual alloys have been forthcoming, the discoveries of the general effects of individual elements in the alloys have been infrequent (See, for example, U. Potapovs and J. R. Hawthorne, "The Effect of Residual Elements on 550° F. Irradiation Response of Selected Pressure Vessel Steels and Weldments," NRL Report 6803, Naval Research Laboratory, Nov. 22, 1968) and, particularly with respect to the effect of nickel, rather uncertain (See, for example, J. R. Hawthorne, "Radiation Embrittlement Resistance of Advanced NiCrMo Steel Plates, Forgings, and Weldments," NRL Report 7573, Naval Research Laboratory, Sept. 13, 1973; also Pressure Vessel Technology, Part III, ASME, 1974, pp. 231-251). The result of this state of knowledge was that, since no very extensive theories relating composition to $\Delta$NDTT had been provided, no broad ranges of desirable weldments had been predicted.

SUMMARY OF THE INVENTION

Accordingly, the object of the present invention is a broad range of weldments that exhibits resistance to neutron-induced changes sufficient to prevent the weldments from being limiting factors in reactor operation.

The weld materials of the present invention are defined by as-deposited weight percentages in the following ranges:

| | |
|---|---|
| Carbon | 0.00–0.15 |
| Manganese | 1.00–2.20 |
| Phosphorus | 0.000–0.015 |
| Sulfur | 0.00–0.02 |
| Silicon | 0.00–0.40 |
| Nickel | 0.00–1.20 |
| Chromium | 0.00–2.50 |
| Molybdenum | 0.30–1.20 |
| Copper | 0.00–0.10 |
| Vanadium | 0.00–0.05 |
| (Balance, essentially iron) | |

A further constraint is that, in its deposited state, $A/B \leq 0.4$, where A is the sum of the weight percents of nickel and silicon in the metal and B is the sum of the weight percents of manganese, chromium, and molybdenum.

BRIEF DESCRIPTION OF THE DRAWINGS

These and further features and advantages can be appreciated by reference to the attached drawings, in which.

DETAILED DESCRIPTION OF THE PREFERRED EMBODIMENT

Figure 1:
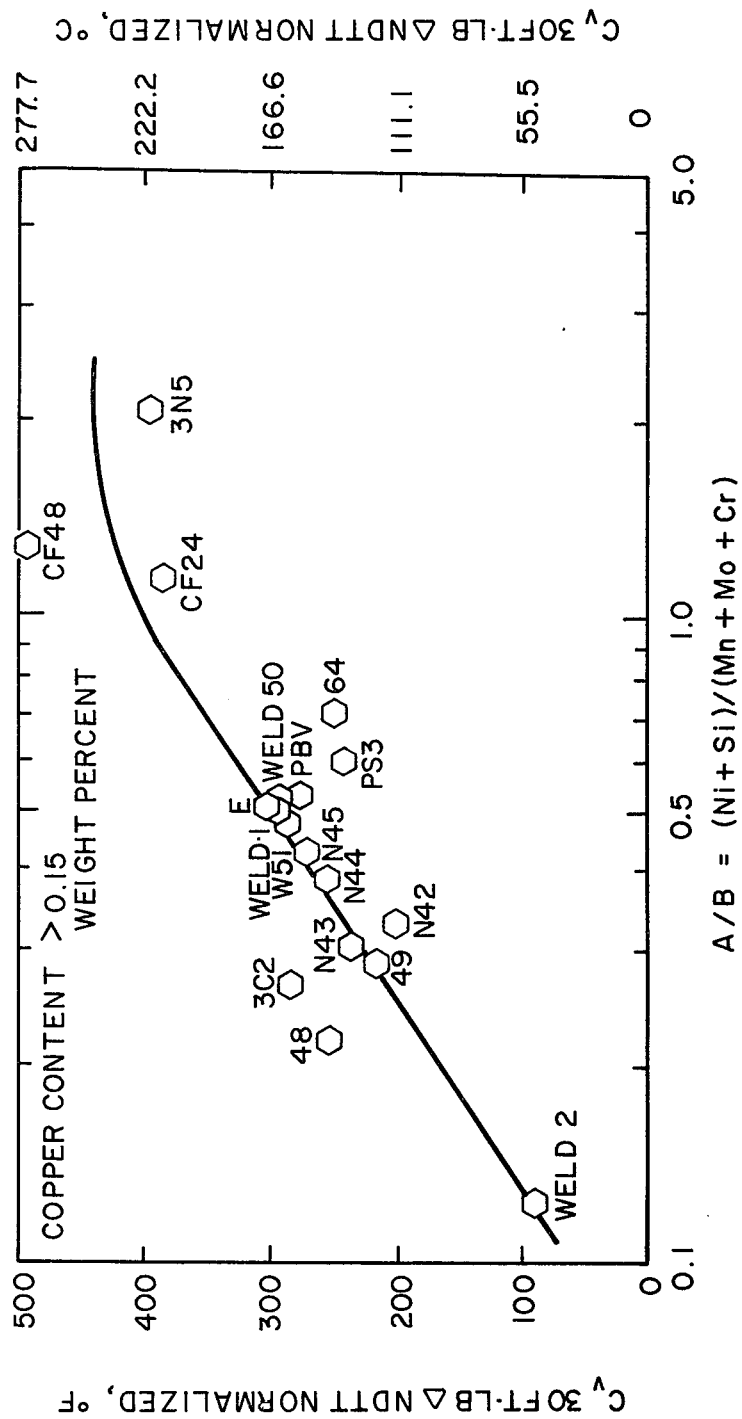
FIG. 1 is a plot of $\Delta$NDTT vs. A/B ratio for welds whose copper content is greater than 0.15 weight percent.

The alloy ranges disclosed in the summary describe the composition of weldments whose change in nil-ductility transition temperature (ΔNDTT) in response to neutron irradiation will be less than or equal to the ΔNDTT of steels commonly used in the fabrication of nuclear-reactor pressure vessels. The steels now used for this application are ASME A508 Class 2, A302B, and A533B. Should HY80 (ASME A543) ever be used, the range of alloys disclosed herein would still afford the desired results.

The composition of the weldments of the present invention have been specified in the as-deposited state. As will be appreciated by those skilled in the art, the makeup of the as-deposited weld metal can be predicted from the composition of the weld wire and welding flux employed. For instance, in submerged-arc welding the flux serves to shield the molten weld from the atmosphere, and the as-deposited weld metal will have just about the same makeup as the weld wire (electrode), although some chemical differences occur due to interaction between the molten weld metal and the flux. Therefore, for submerged-arc welds it is only necessary to order a heat of weld wire that essentially conforms to the specifications given in this disclosure. In a manual arc-welding process, the consumable welding electrode is coated with a flux that both protects the weld during the welding process and contains alloying constituents. The interaction of the flux and the metal electrode produces the desired as-deposited weld alloy. For manual arc welds, therefore, and for electroslag welds, in which chemical interaction between the molten flux and metal occurs to produce the as-deposited weld alloy, the flux and weld metal must be ordered such that the combination of the two during the welding process produces an as-deposited weld alloy conforming to the ranges and A/B ratio disclosed in this specification.

The ordinarily skilled practitioner will also be aware that a heat of weld wire ordered commercially according to the specifications dictated by this disclosure will contain other impurities, but these will be in small quantities in any heat of marketable quality. The inclusion of such levels of impurities does not materially affect the basic and novel characteristics of the composition of the present invention. Accordingly, the phrase "essentially iron" in the claims means that the iron may include ingredients that would not materially affect the basic and novel characteristics of the composition of the present invention, and this includes that purity of iron that is commercially acceptable when ordered according to the requirements of the instant specification.

The significance of the A/B ratio can be appreciated through reference to the following discussion of the development of the range of the present specification. The ranges of the present invention are the result of a search for trends in the published data that would relate composition to ΔNDTT. Initially, the action of carbon in increasing brittleness was assumed in the search. Work by Beeler and Beeler (J. R. Beeler, Jr. and M. F. Beeler, "Attrition and Stabilization of Void Nuclei: Critical Nucleus Size", *Effects of Radiation on Substructure and Mechanical Properties of Metals and Alloys*, ASTM STP 529, American Society for Testing and Materials, 1973, pp. 289–302) concerning the stability of vacancies in neutron-irradiated metals showed that carbon atoms form bound complexes with vacancies in cubic transition metals. The configuration energy of such complexes is low, and this makes it energetically favorable for carbon atoms, either free or those emitted from precipitates by thermal or neutron collision events, to attach themselves to vacancies. The theory behind the present invention is that the presence of these vacancy complexes causes irradiation hardening and thus high NDTT shifts.

Indirect evidence for the carbon-vacancy complex hardening mechanism comes from several sources. Weld 1 from the Combustion Engineering/Nuclear Regulatory Commission/Naval Research Laboratory program (J. R. Hawthorne, et al., "Evaluation of Commercial Production A533-B Plates and Weld Deposits Tailored for Improved Radiation Embrittlement Resistance," ASTM STP 570, American Society for Testing and Materials, Philadelphia, Pa., January 1976; Combustion Engineering, Publication TIS-4191) experienced a large NDTT shift of 315° F. (175° C.) compared to a predicted shift of 250° F. (138° C.) based on copper content. Prior to irradiation, this weld contained numerous carbide precipitates which could act as sources of carbon for formation of carbon-vacancy complexes. Furthermore, Weld 1 contained high nickel, and Smith (R. P. Smith, "Activity of Carbon in Iron-Nickel Alloys at 1000° C.", Trans. AIME, 1960, Vol. 218, pp. 62–64) had shown that nickel increases the thermodynamic activity of carbon in iron. With the activity of carbon so increased, the probability of vacancy-complex and precipitate formation also increases.

Because the nickel content of Weld 1 and HSST Weld 50 were high, and because these factors seemed to be the cause of the unusually high NDTT shifts experienced by the welds, other elements affecting carbon activity (or the apparent effect of nickel) were evaluated. Smith (R. P. Smith, "Equilibrium of Iron-Carbon-Silicon and of Iron-Carbon-Manganese Alloys with Mixture of Methane and Hydrogen at 1000° C.", *Journal of the American Chemical Society*, Vol. 70, 1948, pp. 2724–2729) also had demonstrated that silicon raised carbon activity in iron, whereas manganese lowered it. Molybdenum has been found to counteract the effect of nickel in temper-embrittlement of steels (*Molybdenum for Nuclear Energy Application, a Perspective*, Climax Molybdenum Company, New York, pp. 20–21) and has also been found to suppress irradiation hardening (N. Igata, et al, "The Role of Some Alloying Elements on Radiation Hardening in Pressure Vessel Steels", *Effects of Radiation on Substructure and Mechanical Properties of Metals and Alloys*, ASTM STP 529, American Society for Testing and Materials, 1973, pp. 63–74). Finally, chromium was considered because it had been suggested that chromium might reduce the effects of nickel on radiation sensitivity (L. E. Steele, ed. "Irradiation Effects on Reactor Structural Materials, Aug. 1, 1973 Jan. 31, 1974", NRL Memorandum Report 2752, Naval Research Laboratory, Washington, D. C., March 1974, pp. 12,20). Also, it is known that molybdenum and chromium are strong carbide formers and thus would tend to remove carbon from solid solution. Accordingly, it was decided to study the effects of the various elements mentioned and they were combined into two groups as follows:

| A - Adverse Effect | B - Beneficial (opposing A) |
|---|---|
| nickel, silicon | manganese, molybdenum, chromium |

Ratios were formed for the weld chemistry data by summing the weight-percent values of elements in the A group and dividing by the summation of the weightpercent values of elements in the B group. The weld data were also separated into two groups according to copper content to take into consideration the known effects of copper on irradiation damage.

Correlation of the formed A/B ratios with reported NDTT shift and irradiation fluence was accomplished by normalizing the NDTT-shift values to a fluence of $3.0 \times 10^{19} \text{n/cm}^2$, >1Mev. This was accomplished by plotting the weld NDTT-shift data versus neutron fluence (log-log axes) and drawing straight lines through the data representing NDTT-shift-versus-fluence trends. The slopes of the trend lines were taken and averaged; the average slope was 0.43. The normalization point of $3.0 \times 10^{19} \text{n/cm}^2$, >1Mev was chosen because most of the data were grouped near this fluence and, therefore, normalizing to this point reduces potential error.

The relation used for normalization follows:

$$\Delta NDTT_n = \Delta NDTT_i \left( \frac{\phi_{tn}}{\phi_{ti}} \right)^{0.43}$$

where:
$\Delta NDTT = $ NDTT shift
$\Phi_t = $ neutron fluence
subscript i = initial values
subscript n = normalized values The weld chemistry data are reported in Tables 1 and 2 (high- and low-copper-content groups, respectively). The weld heat treatments employed are listed in Table 3. The weld irradiation data, A/B ratios and normalized NDTT shift values are reported in Table 4. These data represent all known 550° F. (288° C.) irradiation data for welds available at the time of the study. Generally speaking, the names of the data points correspond to their designations in the literature. The numbers listed as literature references in the tables refer to the list of references in Table 5. See Appendix for Tables 1 through 5.

FIG. 1 depicts the normalized ΔNDTT-versus-A/B-ratio plot for weld data belonging to the high-copper group (>0.15 weight percent). The line drawn through the data of FIG. 1 represents the general rise in $\Delta NDTT_n$ experienced as the A/B ratio increases. Data points PS3 and 64 lie below the trend line; this is attributed to rapid cooling from stress-relief annealing or short time of anneal or both (Table 3). Short annealing times hinder carbon diffusion in the weld metal. The importance of carbon diffusion is addressed later, but it is related to the need for carbon atoms to be in certain lattice positions in order to form vacancy complexes. Data point CF48 demonstrates the effect of long heat treatments on NDTT shift. In addition to containing high nickel and copper, the material represented by CF48 was heat treated for a total of 80 hours. The A/B trend curve was drawn below CF48 because point 3N5 (30-hour heat treatment) was thought to be more representative of the general heat treatments given to weldments.

In FIG. 1 (Cu>0.15), the nickel-silicon effects cannot be ignored. Weld 2 had the lowest A/B ratio and the lowest $\Delta NDTT_n$. Its copper level was 0.20 weight percent, compared to points 49 and N44, which contained less copper (0.19 and 0.16 weight percent, respectively) but experienced higher shifts commensurate with their A/B ratios. Data Point E, Weld 50, Weld 1 and W51 contained variable copper levels, yet when plotted as a function of A/B ratio, the four points fall close together at a normalized shift around 300° F. (166° C.). The copper level for points E and Weld 50 was 0.23 weight percent; for Weld 1, 0.36 weight percent; and W51 was reported as being between 0.15 to 0.33 weight percent copper. Data point CF24 contained less copper (0.24 weight percent) than Weld 1 yet experienced a higher shift due to its higher A/B value. Thus, the use of the A/B ratio satisfactorily explains the irradiation behavior of welds that cannot be explained by copper content alone.

Figure 2:
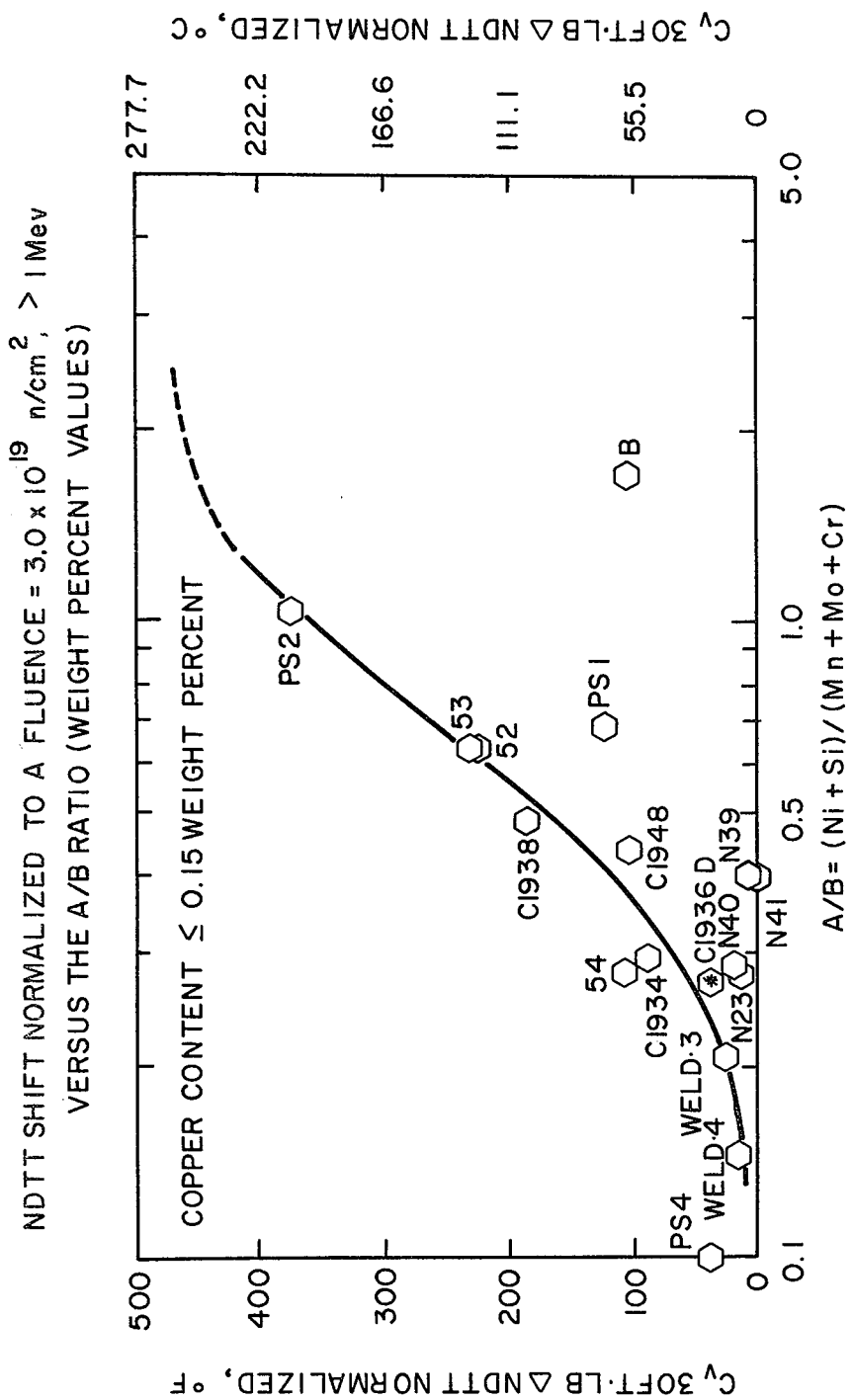
FIG. 2 is a plot of ΔNDTT vs. A/B ratio for welds whose copper content is less than or equal to 0.15 weight percent.

FIG. 2 presents the weld data for the low copper group containing 0.15 weight percent copper or less. As in FIG. 1, there are certain data points that do not lie on the trend curve of FIG. 2. The majority of these points represent weld metals whose structures are other than ferrite. The weld metal of data point N23, used initially in a study by Hawthorne, Fortner and Grant, (J. R. Hawthorne, et al., "Radiation Resistant Experimental Weld Metals for Advanced Reactor Vessel Steels", Welding Research Supplement, October 1970, pp. 453$_s$-458$_s$), was reported by Smidt and Sprague (F. A. Smidt, Jr., and J. A. Sprague, "Property Changes Resulting from Impurity-Defect Interactions in Iron and Pressure Vessel Alloys", ASTM STP 529, American Society for Testing and Materials, 1973, pp. 78-91) to have a metallurgical structure of tempered martensite interspersed with a small amount of tempered bainite. Based on this information, it is assumed that other welds from the initial Hawthorne, Fortner and Grant study (Data Points N40, N39, N41) also had structures other than ferrite. The largest anomaly of FIG. 2 is Data Point B. The weld metal of Point B contained 2.40 weight percent nickel (J. R. Hawthorne, "Radiation-Embrittlement Resistance of Advanced NiCrMo Steel Plates, Forgings, and Weldments", NRL Report 7573, Naval Research Laboratory, Washington, D. C., September 1973). When nickel is present in steel in large amounts, it lowers the austenite-to-ferrite transformation temperature. (Nickel is an austenite stabilizer.) As a result, the structure of the weld metal of Point B upon cooling probably contained martensite, bainite, or both, along with ferrite. The specific microstructure of Data Point B was not reported. Another difference in Point B is the annealing time and the method of cooling from the stress-relief anneal. This weld had a short annealing time of 6.5 hours and was fan cooled from its stress-relief annealing temperature, 1135° F. (613° C.), to 600° F. (316° C.) in 70 minutes. Again, this hinders carbon diffusion during stress-relief anneal.

The effect of the stress-relief annealing treatment is demonstrated by referring back to Data Points CF24, CF48, and 3N5 (FIG. 1). These points also contained large amounts of nickel and could therefore have contained mixed structures. However, their stress-relief annealing times were much longer than that of B. CF24 and CF48 were stress-relief annealed for 65 hours, cooled, and then reannealed for 15 hours; 3N5 was annealed for 30 hours (Table 3). The differences in annealing times support evidence of the effects of carbon diffusion on subsequent irradiation sensitivity.

The nickel-silicon effects on irradiation sensitivity are again evident in FIG. 2. Data point PS2 contained minimal copper (0.05 weight percent) and had a normalized shift of 376° F. (208.8° C.). This shift is considerably higher than that exhibited by Points 52 and 53, containing 0.14 weight percent copper ($\Delta NDTT_n \cong 225°$ F. (125° C.)). However, the shifts are commensurate with the A/B ratios of the data points. The ratio for Point PS2 was 1.07, whereas the ratio of Points 52 and 53 was 0.63.

Figure 3:
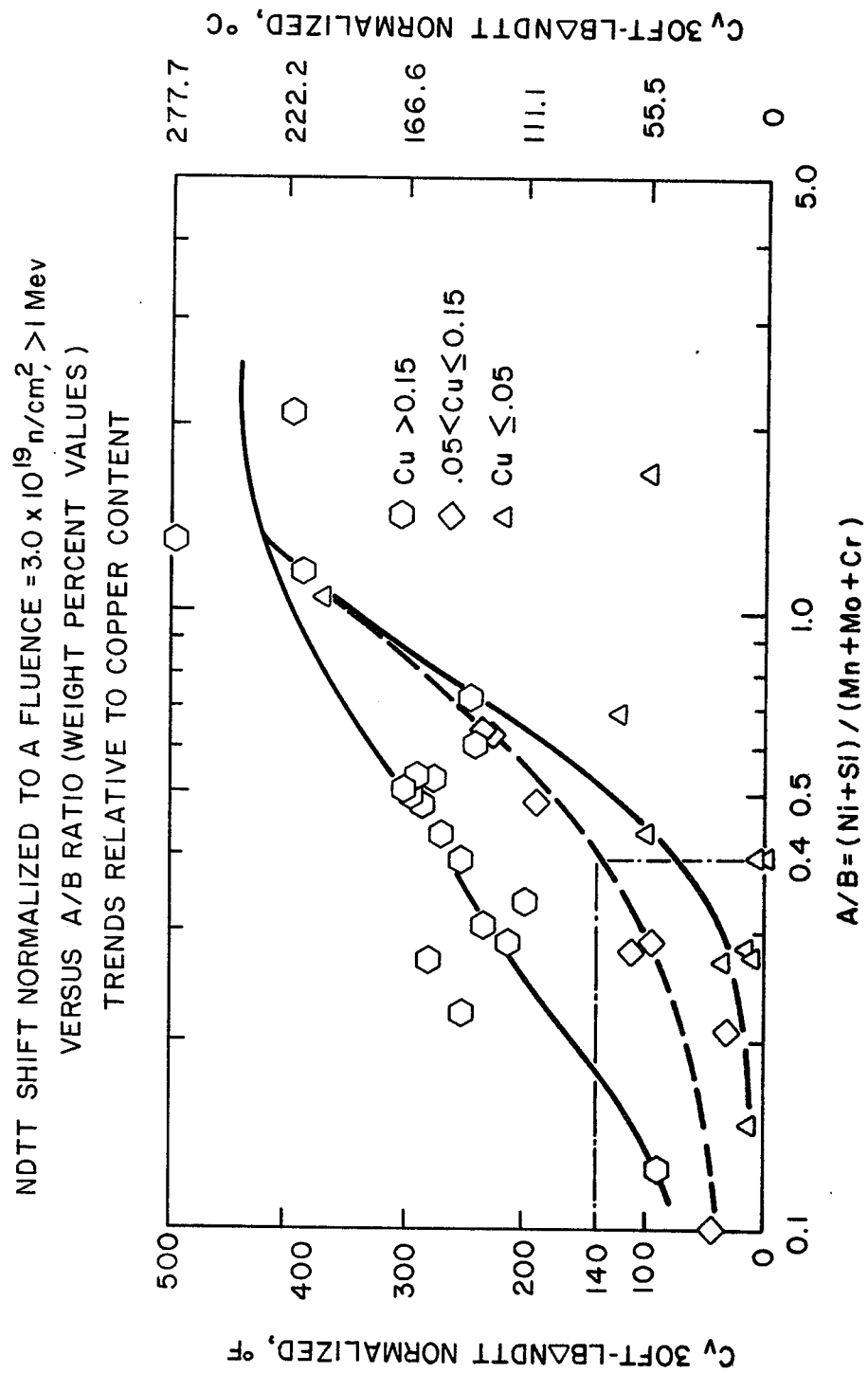
FIG. 3 is a plot of ΔNDTT vs. A/B ratio showing the separate effects of copper content and A/B ratio.

To demonstrate the separate but additive effects of copper and the A/B ratio on NDTT shift, FIG. 3 was developed. FIG. 3 depicts the $\Delta NDTT$ versus A/B weld data separated into three copper weight percent groups:

$Cu \leq 0.05$
$0.05 < Cu \leq 0.15$
$Cu > 0.15$

It can be seen that while the A/B ratio curves predict $\Delta NDTT$ trends, the trend curves start at and indicate higher shift values corresponding to increases in residual copper content. Thus, copper and A/B effects on weld metal irradiation sensitivity are separate but additive.

Given the relationship between A/B and $\Delta NDTT$, it remained to apply this relationship to the search for a range of weldments whose $\Delta NDTT$ was equal to or less than that of the pressure-vessel steels. It was known that pressure-vessel steels undergo changes in NDTT that depend on their copper content, copper until recently having been treated as an impurity upon which strict limits were not imposed. With more than 0.15 percent copper, pressure-vessel steel have $\Delta NDTT$'s of around 260° F. (144° C.). Between 0.05 percent and 0.15 percent the $\Delta NDTT$'s are around 190° F. (106° C.), and below 0.05 percent the $\Delta NDTT$'s are around 140° F. (78° C.). All of these $\Delta NDTT$'s assume a fluence of $3.0 \times 10^{19}$ neutrons/cm$^2$. FIG. 3 shows that, by keeping the carbon content below 0.15 percent and the A/B ratio below 0.4, the $\Delta NDTT$ can be kept at or below that of low-copper pressure-vessel steels, which, as just noted, is 140° F. (78° C.) for a fluence of $3.0 \times 10^{19}$ neutrons/cm$^2$.

It should be noted that the range of the present invention is predicated on a worst-case assumption. Among other things, it assumes long heat treatments. In most cases, when the postweld heat treatments consisted of short times at annealing temperatures, short cooling times from the annealing temperatures, or both, the welds experienced lower NDTT shifts than predicted by the trend lines of FIGS. 1 and 2. These shorter times at temperature hinder the diffusion of carbon through the structure to preferred sites. Beeler and Beeler, supra, have pointed out that the carbon-vacancy complex in alpha iron (ferrite) has a carbon atom positioned a finite distance from the vacancy along a <100> line. In order for the carbon atoms to arrive at these sites, diffusion of carbon through the structure, which is time and temperature dependent, must occur. Therefore, long postweld heat treatments and slow cooling rates aid the diffusion process. When irradiation events take place, the carbon atoms would be in position to pin the vacancies. The activity of the carbon atom would be affected by its nearest neighbor, i.e., a silicon, nickel, manganese, etc., substitutional atom. The high carbon activity resulting from increased nickel and silicon promote the formation of vacancy complexes that produce irradiation hardening and therefore higher NDTT shifts.

Also assumed in arriving at the A/B ratio was a ferritic structure in the weld, since this structure is most susceptible to neutron-induced embrittlement; the nickel-silicon effects seem to apply only to ferrite-structured welds. Five data points in FIG. 2 (N23, N39, N40, N41, B) that lie below the trend line were associated with weld metal whose structure was martensite, bainite, both, or a combination of these with ferrite. In all cases, the data points exhibited lower NDTT shifts than that predicted by their respective A/B ratios. Martensite is a body-centered tetragonal (bct) structure and carbon atoms are trapped in the structure by the martensitic transformation. The formation of bainite occurs by the nucleation of ferrite with carbide rejected. The resulting structure of carbides in ferrite has a very fine particle size. Before carbon-vacancy complexes can form in bainite, the carbon atoms must be knocked out of the carbides by an irradiation collision event and the carbon atoms must diffuse into the ferrite. The effects of structure on the irradiation sensitivity of material were investigated earlier by Hawthorne and Steele (J. R. Hawthorne and L. E. Steele, "Initial Evaluations of Metallurgical Variables as Possible Factors Controlling the Radiation Sensitivity of Structural Steels", NRL Report 6420, Naval Research Laboratory, Washington, D.C., September 1966). In studies with HY80 and A350-LF3 materials, they found that quenched and tempered structures, notably tempered martensite, had lower radiation sensitivity than that of higher temperature transformation products such as ferrite. For both of the materials used in the study (HY80 and A350-LF3), when the heat treatment produced equiaxed ferrite, the irradiated $\Delta NDTT$ was highest.

In addition to the A/B constraint, the constituent ranges must also be complied with. The carbon content should be maintained less than 0.15 weight percent to minimize the amount of carbon present for the pinning of irradiation-induced defects. A low carbon content also maximizes the ductility or notch toughness of the weld bond zone.

The manganese range of 1.00 to 2.20 weight percent is specified to obtain the desired strength characteristics of the weld deposit. Manganese increases strength in ferrite and also increases hardenability in steel alloys. Manganese also counteracts the effect that nickel and silicon have on promoting the vacancy pinning action of carbon.

The phosphorus content is specified to be no greater than 0.015 weight percent, because some researchers have theorized that phosphorus may also play a role in increasing a steel's sensitivity to irradiation damage.

The sulfur content is restricted to 0.40 weight percent maximum to avoid the formation of too many manganese-sulfide inclusions. Such inclusions cause poor notch ductility, which results in high initial (prior to irradiation) NDTT values.

Nickel, although detrimental to the irradiation sensitivity of the weld metal, ensures good initial notch ductility (low initial NDTT values). The range is specified to be 0.00 to 1.20 weight percent to enable the user to match the notch ductility of the parent plate material. If the high side range of nickel is specified, the amounts of manganese, chromium and molybdenum in the alloy must be great enough to keep the A/B ratio below the specified 0.4.

Chromium is a hardening element similar to manganese, although its carbide forming tendencies are greater than those of manganese. As a result, chromium tends to remove carbon atoms from solid solution (chromium carbide formation), thereby preventing carbon atoms from forming bound complexes with the irradiation-induced defects. Its range of 0.00 to 2.50 weight percent is specified to allow the user to vary the weld deposit to obtain necessary hardness and strength characteristics.

The molybdenum range of 0.30 to 1.20 weight percent is also specified to ensure that the weld deposit can meet the necessary hardness and strength characteristics. Molybdenum is also a very strong carbide former and thus has the same effect as chromium on reducing the tendency of carbon to pin irradiation-induced defects.

Copper content is restricted to less than or equal to 0.10 weight percent, because copper is also known to cause high NDTT shifts in welds exposed to irradiation. Lower copper content minimizes the sensitivity of the weld to neutron-induced damage.

Similarly, vanadium is restricted to 0.00 to 0.05 weight percent because certain researchers have thought this element to be detrimental to the irradiation resistance of a weld metal.

While the ranges of the various constituents of the A/B ratio previously specified afford ΔNDTT's compatible with pressure-vessel materials of the type ordinarily used, it is preferable to choose areas within the specified range that will match the strengths and have the joining characteristics appropriate for the specific pressure-vessel material. Accordingly, the following preferred ranges in weight percentages are suggested.

For joining ASME A533B plate:

| | |
|---|---|
| Carbon | 0.00–0.10 |
| Manganese | 1.00–1.25 |
| Phosphorus | 0.00–0.015 |
| Sulfur | 0.00–0.02 |
| Silicon | 0.20–0.30 |
| Nickel | 0.00–0.10 |
| Chromium | 0.00 to 2.50 |
| Molybdenum | 0.40–0.60 |
| Copper | 0.00–0.10 |
| Vanadium | 0.00–0.05 |
| (Balance, essentially iron) | |

For joining A508, Class 2 forging material:

| | |
|---|---|
| Carbon | 0.00–0.10 |
| Manganese | 1.20–1.50 |
| Phosphorus | 0.00–0.015 |
| Sulfur | 0.00–0.02 |
| Silicon | 0.30–0.40 |
| Nickel | 0.50–0.60 |
| Chromium | 0.45–0.65 |
| Molybdenum | 0.30–0.45 |
| Copper | 0.00–0.10 |
| Vanadium | 0.00–0.05 |
| (Balance, essentially iron) | |

For joining ASME 543 plate:

| | |
|---|---|
| Carbon | 0.00–0.08 |
| Manganese | 1.10–1.30 |
| Phosphorus | 0.00–0.015 |
| Sulfur | 0.00–0.01 |
| Silicon | 0.30–0.40 |
| Nickel | 0.65–0.80 |
| Chromium | 1.90–2.20 |
| Molybdenum | 0.90–1.10 |
| Copper | 0.00–0.10 |
| Vanadium | 0.00–0.05 |
| (Balance, essentially iron) | |

Within the above preferred range for joining ASME A533B plate the following composition has been irradiated for testing:

| | |
|---|---|
| Carbon | 0.090 |
| Manganese | 1.130 |
| Phosphorus | 0.008 |
| Sulfur | 0.013 |
| Silicon | 0.250 |
| Nickel | 0.030 |
| Chromium | 0.010 |
| Molybdenum | 0.560 |
| Copper | 0.030 |
| Vanadium | 0.010 |
| Iron | (balance) |

Within the range for ASME A508, Class 2, forging material, the following is a prior-art weld composition modified according to the teachings of the present invention:

| | |
|---|---|
| Carbon | 0.075 |
| Manganese | 1.310 |
| Phosphorus | 0.012 |
| Sulfur | 0.016 |
| Silicon | 0.300 |
| Nickel | 0.560 |
| Chromium | 0.590 |
| Molybdenum | 0.360 |
| Copper | 0.050 |
| Vanadium | 0.010 |
| Iron | (balance) |

Within the range for ASME A543 plate material, the following is a prior-art weld composition modified according to the teachings of the present invention:

| | |
|---|---|
| Carbon | 0.070 |
| Manganese | 1.230 |
| Phosphorus | 0.008 |
| Sulfur | 0.006 |
| Silicon | 0.350 |
| Nickel | 0.710 |
| Chromium | 2.050 |
| Molybdenum | 0.960 |
| Copper | 0.050 |
| Vanadium | 0.050 |
| Iron | (balance) |

TABLE 1

| | | | | High copper weld data points | | | | | | | | | |
|---|---|---|---|---|---|---|---|---|---|---|---|---|---|
| Data Point | Material Welded | Weld* Method | Literature Reference | Chemical Composition (wt %) | | | | | | | | | |
| | | | | C | Mn | P | S | Si | Ni | Cr | Mo | Cu | V | Other |
| Weld-1 | A533-B | S/A | 4 | .14 | 1.38 | .015 | .012 | .22 | .78 | .07 | .55 | .36 | .003 | .004 Al, .012 N |
| CF24 | A543 | S/A | 3 | .07 | 1.07 | .011 | .006 | .37 | 1.58 | .25 | .37 | .24 | — | |
| CF48 | A543 | S/A | 3 | .09 | 1.15 | .011 | .006 | .22 | 2.46 | .39 | .52 | .42 | — | |

TABLE 1-continued

High copper weld data points

| Data Point | Material Welded | Weld* Method | Literature Reference | C | Mn | P | S | Si | Ni | Cr | Mo | Cu | V | Other |
|---|---|---|---|---|---|---|---|---|---|---|---|---|---|---|
| 3N5 | 3½ Ni—Cr—Mo | M | 18 | .10 | 1.08 | .005 | .015 | .28 | 2.60 | Nil | .35 | .51 | — | |
| Weld-50 | A533-B | S/A | 7 | .13 | 1.13 | .011 | .008 | .19 | .68 | .05 | .45 | .23 | .03 | |
| 64 | A533-B | S/A | 19 | .09 | 1.25 | .019 | .13 | .23 | 1.08 | .05 | .52 | .22 | — | .037 Al |
| E | A508-2 | — | 20 | .075 | 1.31 | .012 | .016 | .59 | .56 | .59 | .36 | .23 | .001 | .02 Al, .015 N |
| 48 | A533-B | S/A | 21 | .17 | 1.25 | .015 | .011 | .32 | .11 | .16 | .53 | .22 | .03 | |
| Weld-2 | A533-B | S/A | 4 | .13 | 1.11 | .016 | .013 | .17 | .04 | .05 | .53 | .20 | .01 | <.001 Al, .008 N |
| 49 | A533-B | E/S | 21 | .22 | 1.28 | .008 | .014 | .10 | .40 | .14 | .48 | .19 | .03 | |
| N43 | HY-80 | S/A | 14 | .07 | 1.21 | .007 | .006 | .49 | .80 | 2.07 | .93 | .26 | .04 | |
| N45 | HY-80 | S/A | 14 | .08 | .79 | .007 | .004 | .43 | 1.20 | 2.01 | .93 | .27 | .05 | |
| N44 | HY-80 | S/A | 14 | .09 | 1.00 | .014 | .006 | .46 | 1.08 | 1.99 | .93 | .16 | .04 | |
| N42 | HY-80 | S/A | 14 | .07 | .82 | .007 | .005 | .45 | .82 | 2.04 | .93 | .21 | .05 | |
| 3C2 | A533-C-2 | S/A | 21 | .13 | 1.68 | .016 | .015 | .33 | .14 | .05 | .48 | .27 | .02 | |
| W51 | A533-B | S/A | 22 | .12-.16 | 1.23-1.38 | .013-.017 | .008-.015 | .05-.15 | .72-.76 | — | .39-.53 | .15-.33 | — | |
| PBV | A302-B | S/A | 23 | .09 | 1.47 | .019 | .024 | .49 | .57 | .13 | .39 | .18 | — | |
| PS3 | Ni—Cr—Mo | S/A | 24 | .06 | 1.85 | .012 | .003 | .21 | 1.30 | .08 | .56 | .29 | .02 | .015 Al, .011 N |

*S/A - Submerged Arc; M - Manual; E/S - Electroslag

TABLE 2

Low copper weld data points

| Data Point | Material Welded | Weld Method | Literature Reference | C | Mn | P | S | Si | Ni | Cr | Mo | Cu | V | Other |
|---|---|---|---|---|---|---|---|---|---|---|---|---|---|---|
| 52 | A533-B | S/A | 25 | .19 | 1.24 | .010 | .014 | .19 | .93 | .08 | .45 | .14 | .02 | |
| 53 | A533-B | S/A | 25 | .19 | 1.24 | .010 | .014 | .19 | .93 | .08 | .45 | .14 | .02 | |
| 54 | A533-B | E/S | 26 | .20 | 1.42 | .002 | .012 | .13 | .43 | .07 | .49 | .09 | — | .03 Al |
| C1938 | A543 | M | 3 | .03 | .72 | .009 | .010 | .34 | 1.62 | 2.39 | .92 | .07 | .03 | |
| C1948 | A543 | M | 3 | .05 | .82 | .007 | .006 | .20 | 1.56 | 2.32 | .92 | .05 | .03 | |
| C1934 | A543 | M | 3 | .04 | .87 | .008 | .010 | .40 | .77 | 2.08 | 1.01 | .06 | .02 | |
| C1936 | A543 | M | 3 | .06 | .86 | .007 | .010 | .30 | .78 | 2.08 | 1.01 | .02 | .02 | |
| PS2 | Mn—Ni—Mo—V | S/A | 24 | .07 | 1.20 | .016 | .006 | .25 | 1.53 | .09 | .41 | .05 | .03 | .025 Al, .008 N |
| Weld-3 | A533-B | S/A | 4 | .145 | 1.145 | .0095 | .0095 | .25 | .115 | .04 | .59 | .07 | .008 | .006 Al, .005 N |
| Weld-4 | A533-B | S/A | 4 | .15 | 1.25 | .004 | .010 | .19 | .09 | .06 | .62 | .05 | .007 | .001 Al, .004 N |
| B | A543 | S/A | 16 | .09 | 1.16 | .006 | .007 | .56 | 2.40 | .09 | .49 | .03 | .01 | <.01 Al |
| D | A543 | S/A | 16 | .10 | .84 | .006 | .008 | .35 | .83 | 2.40 | 1.10 | .01 | .02 | |
| N23 | Ni—Cr—Mo | S/A | 14 | .06 | .90 | .006 | .005 | .49 | .55 | 1.95 | .87 | .03 | — | |
| N40 | HY-80 | S/A | 14 | .07 | 1.23 | .007 | .006 | .51 | .71 | 2.07 | .96 | .04 | .05 | |
| N41 | HY-80 | S/A | 14 | .07 | .84 | .007 | .004 | .46 | 1.10 | 2.06 | 1.01 | .01 | .05 | |
| N39 | HY-80 | S/A | 14 | .07 | 1.16 | .007 | .007 | .46 | 1.21 | 2.07 | .95 | .04 | .05 | |
| PS1 | A533-B | S/A | 24 | .09 | 1.36 | .020 | .004 | .34 | 1.08 | .20 | .51 | .10 | .03 | .022 Al, .0105 N |
| PS4 | Ni—Cr—Mo | S/A | 24 | .06 | 2.29 | .014 | .007 | .27 | .09 | .95 | .45 | .09 | .01 | .002 Al, .008 N |

S/A - Submerged Arc; M - Manual; E/S Electroslag

TABLE 3

Heat treatment

| Data Point | Material Welded | Weld* Method | Literature Reference | Postweld Heat Treatment Unless Specified Differently |
|---|---|---|---|---|
| 52 | A533-B | S/A | 25 | 1150° ±25° F. for 40 hours; |
| 53 | A533-B | S/A | 25 | furnace cooled to below 600° F. |
| Weld-1 | A533-B | S/A | 4 | Interstage stress relief - 1100°- |
| Weld-2 | A533-B | S/A | 4 | 1150° F. for 15 min. |
| Weld-3 | A533-B | S/A | 4 | Final - 1150° F. for 40 hours, |
| Weld-4 | A533-B | S/A | 4 | furnace cooled to 600° F. |
| C1934 | A543 | M | 3 | 1125°-1150° F. for 30 hours; |
| C1936 | A543 | M | 3 | furnace cooled to 600° F. |
| C1938 | A543 | M | 3 | |
| C1948 | A543 | M | 3 | |
| CF24 | A543 | S/A | 3 | 1050°-1075° F. for 65 hours; |
| CF48 | A543 | S/A | 3 | furnace cooled to 600° F. 1075°- for 15 hours; furnace cooled to 700° F. |
| N23 | Ni—Cr—Mo | S/A | 14 | 1150° F. for 8 hours; furnace |
| N40 | HY-80 | S/A | 14 | cooled |
| N41 | HY-80 | S/A | 14 | |
| N39 | HY-80 | S/A | 14 | |
| N43 | HY-80 | S/A | 14 | |
| N45 | HY-80 | S/A | 14 | |
| N42 | HY-80 | S/A | 14 | |
| 3N5 | 3.5 Ni—Cr—Mo | M | 18 | 1100° ±25° F. for 30 hours; furnace cooled to 600° F. at 100° F./hr max. |
| Weld-50 | A533-B | S/A | 7 | 1150° ±25° F. for 12 hours; furnace cooled |
| 64 | A533-B | S/A | 19 | 1148° F. for 27 hours; air cooled |

TABLE 3-continued

| Data Point | Material Welded | Weld* Method | Heat treatment Literature Reference | Postweld Heat Treatment Unless Specified Differently |
|---|---|---|---|---|
| 49 | A533-B | E/S | 21 | Austenitized at 1675°–1725° F. for 6 hours, brine quenched; reaustenitized at 1660°–1650° F. for 6 hous, brine quenched; tempered at 1200°–1225° F. for 6 hours, brine quenched; stress relief annealed at 1115°–1135° F. for 30 hours, furnace cooled at 40° F./hour (max.) |
| 54 | A533-B | E/S | 26 | Same as data point 49 except quenching medium was water |
| 48 | A533-B | S/A | 21 | 1125° F. for 20 hours; furnace cooled |
| 3C2 | A533-C | S/A | 21 | |
| E | A508-2 | — | 20 | 1100° F. for 11¼ hours; furnace cooled |
| B | A543 | S/A | 16 | 1135° F. for 6.5 hours; fan cooled 1135° F. to 600°F. in 70 min.. |
| D | A543 | S/A | 16 | 1135° F. for 6 hours, still air cooled |
| PS2 | Mn—Ni—Mo—V | S/A | 24 | 1022° F. for 5 hours, furnace cooled; +1022° F. for 50 hours, furnace cooled; +1148° F. for 15 hours, furnace cooled |
| N44 | HY-80 | S/A | 14 | 1150° F. for 8 hours as specimen blanks in a laboratory tube furnace. Rapidly cooled in an argon steam (1150° F. to 75° F. in 30 min.) |
| W51 | A533-B | S/A | 22 | 1150° ±25° F. for 37 hours, furnace cooled to 600° F. |
| PBV | A302 | S/A | 23 | Unknown |
| PS1 | A533-B | S/A | 24 | 1148° F. for 15 min./air cooled +1148° F. for 12 hours, furnace cooled to 600° F. |
| PS3 | Ni—Cr—Mo | S/A | 24 | 1112° F. for 3 hours, furnace cooled |
| PS4 | Ni—Cr—Mo | S/A | 24 | 1022° F. for 50 hours, furnace cooled; +1112° F. for 15 hours, furnace cooled |

*S/A - Submerged Arc; M - Manual, E/S - Electroslag

TABLE 4

Irradiation data and A/B ratios

| Data Point | Material Welded | Weld* Method | Literature Reference | Copper Content (wt %) | A/B (wt %) | A/B (at wt %) | Fluence ($10^{19}$ n/cm$^2$, >1 Mev) (at 550° F.) | ΔNDTT at 30 ft-lb (Deg. F.) | (Deg. C.) | ΔNDTT Normalized (Deg. F.) | (Deg. C.) |
|---|---|---|---|---|---|---|---|---|---|---|---|
| Weld-1 | A533-B | S/A | 4 | 0.36 | 0.50 | .650 | 3.4 | 315 | 175 | 298 | 165.5 |
| CF24 | A543 | S/A | 3 | 0.24 | 1.15 | 1.408 | 3.5 | 415 | 230.5 | 388 | 215.5 |
| CF48 | A543 | S/A | 3 | 0.42 | 1.3009 | 1.455 | 3.5 | 530 | 294.4 | 496 | 275.5 |
| 3N5 | 3.5 Ni—Cr—Mo | M | 18 | 0.51 | 2.01 | 2.310 | 2.9 | 390 | 216.6 | 396 | 220 |
| Weld-50 | A533-B | S/A | 9 | 0.23 | 0.534 | .696 | 2.5 | 270 | 150 | 292 | 162.2 |
| 64 | A533-B | S/A | 19 | 0.22 | 0.720 | .9198 | 3.5 | 265 | 147.2 | 248 | 137.7 |
| E** | A508-2 | — | 20 | 0.23 | 0.510 | .7820 | 0.49 | 140 | 77.7 | 305 | 169.4 |
| 48 | A533-B | S/A | 21 | 0.22 | 0.221 | .4196 | 1.7 | 200*** | 111.1 | 255 | 141.6 |
| Weld-2 | A533-B | S/A | 4 | 0.20 | 0.124 | .2433 | 3.4 | 95 | 52.7 | 90 | 50 |
| 49 | A533-B | E/S | 21 | 0.19 | 0.290 | .3353 | 1.6 | 165 | 91.6 | 216 | 120 |
| N43 | HY-80 | S/A | 14 | 0.26 | 0.3064 | .4369 | 2.8 | 230 | 127.7 | 237 | 131.6 |
| N45 | HY-80 | S/A | 14 | 0.27 | 0.4369 | .5690 | 2.8 | 265 | 147.2 | 273 | 151.6 |
| N42 | HY-80 | S/A | 14 | 0.21 | 0.3350 | .5259 | 2.8 | 195 | 108.3 | 201 | 111.6 |
| N44 | HY-80 | S/A | 14 | 0.16 | 0.3928 | .4690 | 2.8 | 250 | 138.9 | 257 | 142.7 |
| 3C2 | A533-C2 | S/A | 21 | 0.27 | 0.2126 | .3881 | 1.4 | 205 | 113.8 | 284 | 157.7 |
| W51 | A533-B | S/A | 27 | .15–.33 | 0.477 | .5733 | 1.16+ | 190 | 105.5 | 286 | 158.8 |
| PBV | A302-B | S/A | 23 | 0.18 | 0.532 | .8252 | 0.358 | 110 | 61.1 | 274 | 152.2 |
| PS3 | Ni—Cr—Mo | S/A | 24 | 0.29 | 0.606 | .7206 | 5.0++ | 297 | 165 | 238 | 132.2 |
| 52 | A533-B | S/A | 25 | 0.14 | 0.633 | .786 | 0.5 | 105 | 58.3 | 227 | 126.1 |
| 53 | A533-B | S/A | 25 | 0.14 | 0.633 | .786 | 2.4 | 210 | 116.6 | 231 | 128.3 |
| 54 | A533-B | E/S | 26 | 0.09 | 0.283 | .3764 | 2.5 | 100 | 55.5 | 108 | 60.0 |
| C1938 | A543 | M | 3 | 0.07 | 0.486 | .5760 | 3.5 | 200 | 111.1 | 187 | 103.8 |
| C1948 | A543 | M | 3 | 0.05 | 0.434 | .4884 | 3.5 | 110 | 61.1 | 103 | 57.2 |
| C1934 | A543 | M | 3 | 0.06 | 0.295 | .4109 | 3.5 | 95 | 52.7 | 89 | 49.4 |
| C1936 | A543 | M | 3 | 0.02 | 0.2734 | .3632 | 3.5 | 45 | 25.0 | 42 | 23.3 |
| PS2 | Mn—Ni—Mo—V | S/A | 24 | 0.05 | 1.07 | 1.258 | 5.0++ | 468 | 260 | 376 | 208.8 |
| Weld-3 | A533-B | S/A | 4 | 0.07 | 0.206 | .3987 | 4.9 | 35 | 19.4 | 28 | 15.5 |
| Weld-4 | A533-B | S/A | 4 | 0.05 | 0.145 | .2738 | 4.9 | 20 | 11.1 | 16 | 8.8 |
| B | A543 | S/A | 16 | 0.03 | 0.70 | 2.188 | 3.6 | 110 | 61.1 | 102 | 56.6 |
| D | A543 | S/A | 16 | 0.01 | 0.273 | .3655 | 3.6 | 45 | 25 | 42 | 23.3 |
| N23 | Ni—Cr—Mo | S/A | 14 | 0.03 | 0.2795 | .4270 | 2.8 | 15 | 8.3 | 15.4 | 8.5 |
| N40 | HY-80 | S/A | 14 | 0.04 | 0.2863 | .4190 | 2.8 | 20 | 11.1 | 20.6 | 11.4 |
| N41 | HY-80 | S/A | 14 | 0.01 | 0.3989 | .5385 | 2.8 | 0 | 0 | 0 | 0 |

TABLE 4-continued

| | | | | Irradiation data and A/B ratios | | | | | | | |
|---|---|---|---|---|---|---|---|---|---|---|---|
| | | | Lit- | | | | Fluence | | | | |
| | | Weld* | erature | Copper | | | ($10^{19}$ n/cm$^2$, | | | | |
| Data | Material | Me- | Ref- | Content | A/B | A/B | >1 Mev) | ΔNDTT at 30 ft-lb | | ΔNDTT Normalized | |
| Point | Welded | thod | erence | (wt %) | (wt %) | (at wt %) | (at 550° F.) | (Deg. F.) | (Deg. C.) | (Deg. F.) | (Deg. C.) |
| N39 | HY-80 | S/A | 14 | 0.04 | 0.3995 | .5242 | 2.8 | 10 | 5.5 | 10.3 | 5.7 |
| PS1 | A533-B | S/A | 24 | 0.05 | .6859 | .8990 | 5.0++ | 153 | 85 | 123 | 68.3 |
| PS4 | Ni—Cr—Mo | S/A | 24 | 0.09 | .097 | .1727 | 5.0++ | 54 | 30 | 43 | 23.8 |

*S/A - Submerged Arc; M - Manual; E/S -Electroslag
**Irradiation Temp. unknown - irradiated in R.E. Ginna Unit 1 Reactor
***$C_v$ 40 ft-lb index
+Irradiated at 563° F.
++Irradiated at 572° F.

TABLE 5

REFERENCES (1) J. R. Hawthorne, et al, "Irradiation Effects on Reactor Structural Materials", NRL Memorandum Report 1753, Naval Research Laboratory, Washington, D.C., Feb. 15, 1967.

(2) U. Potapovs and J. R. Hawthorne, "The Effects of Residual Elements on 550 F Irradiation Response of Selected Pressure Vessel Steels and Weldments", NRL Report 6803, Naval Research Laboratory, Washington, D.C., Nov. 22, 1968.

(3) L. E. Steele, et al, "Irradiation Effects on Reactor Structural Materials", NRL Memorandum Report 1937, Naval Research Laboratory, Washington, D.C., Nov. 15, 1968.

(4) J. R. Hawthorne, "Demonstration Of Improved Radiation Embrittlement Resistance of A533-B Steel Through Control of Selected Residual Elements", *Irradiation Effects on Structural Alloys for Nuclear Reactor Applications*, ASTM STP 484, American Society for Testing and Materials, 1970, pp. 96-127.

(5) J. R. Hawthorne, et al, "Evaluation of Commercial Production A533-B Plates and Weld Deposits Tailored for Improved Radiation Embrittlement Resistance," ASTM STP 570, American Society for Testing and Materials, Philadelphia, Pa., January 1976; Combustion Engineering Publication TIS-4191.

(6) L. E. Steele, "Neutron Irradiation Embrittlement of Reactor Pressure Vessel Steels", International Atomic Energy Agency, Technical Report Series No. 163, 1975, pp. 117-119.

(7) J. R. Hawthorne, "Postirradiation Dynamic Tear and Charpy-V Performance of 12-in. Thick A533-B Steel Plates and Weld Metal", Nuclear Engineering and Design, 17, 1971, pp. 116-130.

(8) J. R. Beeler, Jr. and M. F. Beeler, "Attrition and Stabilization of Void Nuclei: Critical Nucleus Size", *Effects of Radiation on Substructure and Mechanical Properties of Metals and Alloys*, ASTM STP 529, American Society for Testing and Materials, 1973, pp. 289-302.

(9) R. P. Smith, "Activity of Carbon in Iron-Nickel Alloys at 1000° C.", Trans. AIME, 1960, Vol. 218, pp. 62-64.

(10) R. P. Smith, "Equilibrium of Iron-Carbon-Silicon and of Iron-Carbon-Manganese Alloys with Mixture of Methane and Hydrogen at 1000° C.", *Journal of the American Chemical Society*, Vol. 70, 1948, pp. 2724-2729.

(11) *Molybdenum for Nuclear Energy Applications, a Perspective*, Climax Molybdenum Company, New York, pp. 20-21.

(12) N. Igata, et al, "The Role of Some Alloying Elements on Radiation Hardening in Pressure Vessel Steels", *Effects of Radiation on Substructure and Mechanical Properties of Metals and Alloys*, ASTM STP 529, American Society for Testing and Materials, 1973, pp. 63-74.

(13) L. E. Steele, ed. "Irradiation Effects on Reactor Structural Materials, August 1, 1973–January 31, 1974", NRL Memorandum Report 2752, Naval Research Laboratory, Washington, D.C., March 1974, pp. 12, 20.

(14) J. R. Hawthorne, et al, "Radiation Resistant Experimental Weld Metals for Advanced Reactor Vessel Steels", Welding Research Supplement, October 1970, pp. 453$_s$–458$_s$.

(15) F. A. Smidt, Jr., and J. A. Sprague, "Property Changes Resulting from Impurity-Defect Interactions in Iron and Pressure Vessel Alloys", ASTM STP 529, American Society for Testing and Materials, 1973, pp. 78-91.

(16) J. R. Hawthorne, "Radiation-Embrittlement Resistance of Advanced NiCrMo Steel Plates, Forgings, and Weldments", NRL Report 7573, Naval Research Laboratory, Washington, D.C., September 1973.

(17) J. R. Hawthorne and L. E. Steele, "Initial Evaluations of Metallurgical Variables as Possible Factors Controlling the Radiation Sensitivity of Structural Steels", NRL Report 6420, Naval Research Laboratory, Washington, D.C., September 1966.

(18) L. E. Steele, et al, "Irradiation Effects on Reactor Structural Materials, Quarterly Progress Report Aug. 1–Oct. 31, 1966", NRL Memorandum Report 1731, Naval Research Laboratory, Washington, D.C., November 1966.

(19) T. R. Mager and F. O. Thomas, "Evaluation by Linear Elastic Fracture Mechanics of Radiation Damage to Pressure Vessel Steels", WCAP-7328, Westinghouse Electric Corporation, Pittsburgh, Pa., October 1969.

(20) T. R. Mager, et al, "Analysis of Capsule V from the Rochester Gas and Electric R. E. Ginna Unit No. 1 Reactor Vessel Radiation Surveillance Program", Westinghouse Electric Corporation, Pittsburgh, Pa., March 1973.

(21) J. R. Hawthorne and U. Potapovs, "Initial Assessments of Notch Ductility Behavior of A533 Pressure Vessel Steel with Neutron Irradiation", NRL Report 6772, Naval Research Laboratory, Washington, D.C., November 1968.

(22) C. E. Childress, "Fabrication Procedures and Acceptance Data for ASTM A-533 Welds and A 10-in.-thick ASTM A-543 Plate of the Heavy Section Steel Technology Program, Documentary Report 3", ORNL-4313-3, Oak Ridge National Laboratory, Oak Ridge, Tenn., January 1971.

(23) J. S. Perrin et al, "Point Beach Nuclear Plant Unit No. 1 Pressure Vessel Surveillance Program, Evaluation of Capsule V", June 15, 1973.

(24) D. Pachur and G. Sievers, "Development Programmes on Irradiation Embrittlement of Low Alloy Pressure Vessel Steels in the Federal Republic of Germany", ASTM STP 570, to be published.

(25) L. E. Steele, et al, "Irradiation Effects on Structural Materials, Quarterly Progress Report Aug. 1, 1968–Oct. 31, 1968", NRL Memorandum Report 1938, Naval Research Laboratory, Washington, D.C., November 1968.

(26) L. E. Steele, et al, "Irradiation Effects on Reactor Structural Materials, Quarterly Progress Report, May 1–July 31, 1969", NRL Memorandum Report 2027, Naval Research Laboratory, Washington, D.C., August 1969.

(27) W. J. Stelzman and R. G. Berggren, "Radiation Strengthening and Embrittlement in Heavy-Section Steel Plates and Welds", ORNL-4871, Oak Ridge National Laboratory, Oak Ridge, Tenn., June 1973.

What is claimed is:

1. In the method of constructing nuclear-reactor pressure vessels wherein forging or plate-material pressure-vessel parts are joined to form the pressure vessel, the improvement wherein the joining step comprises welding the nuclear-reactor pressure-vessel parts by depositing a weldment that exhibits resistance to neutron-induced changes sufficient to prevent the weldment from being a limiting factor in reactor operations, said weldment, as deposited, consisting by weight percentages of:

| Carbon | 0.00 to 0.15 |
|---|---|
| Manganese | 1.00 to 2.20 |
| Phosphorus | 0.000 to 0.015 |
| Sulfur | 0.00 to 0.02 |
| Silicon | 0.00 to 0.40 |
| Nickel | 0.00 1.20 |
| Chromium | 0.00 to 2.50 |
| Molybdenum | 0.30 to 1.20 |
| Copper | 0.00 to 0.10 |
| Vanadium | 0.00 to 0.05 | the balance being essentially iron having a ferritic structure, and wherein in said weldment the sum of the weight percentages of nickel and silicon bears a ratio of 0.4 or less to the sum of the weight percentages of manganese, chromium, and molybdenum.

2. A method as recited in claim 1, wherein the welding step comprises welding nuclear-reactor pressure-vessel parts comprising ASME A533 Grade B plate material by depositing a weldment that, as deposited, consists by weight percentages of:

| Carbon | 0.00 to 0.10 |
|---|---|
| Manganese | 1.00 to 1.25 |
| Phosphorus | 0.00 to 0.015 |
| Sulfur | 0.00 to 0.02 |
| Silicon | 0.20 to 0.30 |
| Nickel | 0.00 to 0.10 |
| Chromium | 0.00 to 2.50 |
| Molybdenum | 0.40 to 0.60 |
| Copper | 0.00 to 0.10 |
| Vanadium | 0.00 to 0.05, | the balance being essentially iron.

3. A method as recited in claim 2, wherein the as-deposited weldment consists essentially of:

| Carbon | 0.090 |
|---|---|
| Manganese | 1.130 |
| Phosphorus | 0.008 |
| Sulfur | 0.013 |
| Silicon | 0.250 |
| Nickel | 0.030 |
| Chromium | 0.010 |
| Molybdenum | 0.560 |
| Copper | 0.030 |
| Vanadium | 0.010 | the balance being essentially iron.

4. A method as recited in claim 1, wherein the welding step comprises welding nuclear-reactor pressure-vessel parts comprising ASME A508 Class 2 forging material by depositing a weldment that, as deposited, consists by weight percentages of:

| Carbon | 0.00 to 0.10 |
|---|---|
| Manganese | 1.20 to 1.50 |
| Phosphorus | 0.00 to 0.015 |
| Sulfur | 0.00 to 0.02 |
| Silicon | 0.30 to 0.40 |
| Nickel | 0.50 to 0.60 |
| Chromium | 0.45 to 0.65 |
| Molybdenum | 0.30 to 0.45 |
| Copper | 0.00 to 0.10 |
| Vanadium | 0.00 to 0.05, | the balance being essentially iron.

5. A method as recited in claim 4, wherein the as-deposited weldment consists by weight percentages essentially of:

| Carbon | 0.075 |
|---|---|
| Manganese | 1.310 |
| Phosphorus | 0.012 |
| Sulfur | 0.016 |
| Silicon | 0.300 |
| Nickel | 0.560 |
| Chromium | 0.590 |
| Molybdenum | 0.360 |
| Copper | 0.050 |
| Vanadium | 0.010, | the balance being essentially iron.

6. A method as recited in claim 1, wherein the welding step comprises welding nuclear-reactor pressure-vessel parts comprising ASME A543 plate material by depositing a weldment that, as deposited, consists by weight percentages of:

| Carbon | 0.00 to 0.08 |
|---|---|
| Manganese | 1.10 to 1.30 |
| Phosphorus | 0.00 to 0.015 |
| Sulfur | 0.00 to 0.01 |
| Silicon | 0.30 to 0.40 |
| Nickel | 0.65 to 0.80 |
| Chromium | 1.90 to 2.20 |
| Molybdenum | 0.90 to 1.10 |
| Copper | 0.00 to 0.10 |
| Vanadium | 0.00 to 0.05, | the balance being essentially iron.

7. A method as recited in claim 6, wherein the as-deposited weldment consists by weight percentages essentially of:

| Carbon | 0.070 |
|---|---|

-continued

|  |  |
|---|---|
| Manganese | 1.230 |
| Phosphorus | 0.008 |
| Sulfur | 0.006 |
| Silicon | 0.350 |
| Nickel | 0.710 |
| Chromium | 2.050 |
| Molybdenum | 0.960 |
| Copper | 0.050 |
| Vanadium | 0.050, | the balance being essentially iron.

8. A method as recited in claim 1, wherein the welding step comprises welding pressure vessel parts that comprise a steel chosen from the group consisting of ASME A533 Grade B plate material, ASME A508 Class 2 forging material, and ASME A543 plate material.

9. An article comprising steel parts welded together by depositing a weldment that exhibits resistance to neutron-induced changes sufficient to prevent the weldment from being a limiting factor in operations, said weldment, as deposited, consisting by weight percentages of:

|  |  |
|---|---|
| Carbon | 0.00 to 0.15 |
| Manganese | 1.00 to 2.20 |
| Phosphorus | 0.000 to 0.015 |
| Sulfur | 0.00 to 0.02 |
| Silicon | 0.00 to 0.40 |
| Nickel | 0.00 1.20 |
| Chromium | 0.00 to 2.50 |
| Molybdenum | 0.30 to 1.20 |
| Copper | 0.00 to 0.10 |
| Vanadium | 0.00 to 0.05 | the balance being essentially iron having a ferritic structure, and wherein in said weldment the sum of the weight percentages of nickel and silicon bears a ratio of 0.4 or less to the sum of the weight percentages of manganese, chromium, and molybdenum, the article having been exposed to neutron fluences greater than $10^{17}$ neutrons/cm$^2$.

10. An article as recited in claim 9, wherein the steel parts are made of ASME A533 Grade B plate material and wherein the as-deposited weldment consists by weight percentages of:

|  |  |
|---|---|
| Carbon | 0.00 to 0.10 |
| Manganese | 1.00 to 1.25 |
| Phosphorus | 0.00 to 0.015 |
| Sulfur | 0.00 to 0.02 |
| Silicon | 0.20 to 0.30 |
| Nickel | 0.00 to 0.10 |
| Chromium | 0.00 to 2.50 |
| Molybdenum | 0.40 to 0.60 |
| Copper | 0.00 to 0.10 |
| Vanadium | 0.00 to 0.05, | the balance being essentially iron.

11. An article as recited in claim 10, wherein the as-deposited weldment consists by weight percentages essentially of:

|  |  |
|---|---|
| Carbon | 0.090 |
| Manganese | 1.130 |
| Phosphorus | 0.008 |
| Sulfur | 0.013 |
| Silicon | 0.250 |
| Nickel | 0.030 |
| Chromium | 0.010 |
| Molybdenum | 0.560 |
| Copper | 0.030 |
| Vanadium | 0.010 | the balance being essentially iron.

12. An article as recited in claim 9, wherein the steel parts comprise ASME A508 Class 2 forging material and wherein the as-deposited weldment consists by weight percentages of:

|  |  |
|---|---|
| Carbon | 0.00 to 0.10 |
| Manganese | 1.20 to 1.50 |
| Phosphorus | 0.00 to 0.015 |
| Sulfur | 0.00 to 0.02 |
| Silicon | 0.30 to 0.40 |
| Nickel | 0.50 to 0.60 |
| Chromium | 0.45 to 0.65 |
| Molybdenum | 0.30 to 0.45 |
| Copper | 0.00 to 0.10 |
| Vanadium | 0.00 to 0.05, | the balance being essentially iron.

13. An article as recited in claim 12, wherein the as-deposited weldment consists by weight percentages essentially of:

|  |  |
|---|---|
| Carbon | 0.075 |
| Manganese | 1.310 |
| Phosphorus | 0.012 |
| Sulfur | 0.016 |
| Silicon | 0.300 |
| Nickel | 0.560 |
| Chromium | 0.590 |
| Molybdenum | 0.360 |
| Copper | 0.050 |
| Vanadium | 0.010, | the balance being essentially iron.

14. An article as recited in claim 9, wherein the steel parts comprise ASME A543 plate material and wherein the as-deposited weldment consists by weight percentages of:

|  |  |
|---|---|
| Carbon | 0.00 to 0.08 |
| Manganese | 1.10 to 1.30 |
| Phosphorus | 0.00 to 0.015 |
| Sulfur | 0.00 to 0.01 |
| Silicon | 0.30 to 0.40 |
| Nickel | 0.65 to 0.80 |
| Chromium | 1.90 to 2.20 |
| Molybdenum | 0.90 to 1.10 |
| Copper | 0.00 to 0.10 |
| Vanadium | 0.00 to 0.05, | the balance being essentially iron.

15. An article as recited in claim 14, wherein the as-deposited weldment consists by weight percentages essentially of:

|  |  |
|---|---|
| Carbon | 0.070 |
| Manganese | 1.230 |
| Phosphorus | 0.008 |
| Sulfur | 0.006 |
| Silicon | 0.350 |
| Nickel | 0.710 |
| Chromium | 2.050 |
| Molybdenum | 0.960 |
| Copper | 0.050 |
| Vanadium | 0.050, | the balance being essentially iron.

16. An article as recited in claim 9, wherein the steel parts comprise a steel selected from the group consisting of ASME A533 Grade B plate material, ASME A508 Class 2 forging material, and ASME A543 plate material.

* * * * *